UNITED STATES PATENT OFFICE.

GEORGE WARREN, OF ILFORD, ENGLAND.

MANUFACTURE OF CEMENT OR SIMILAR MATERIALS.

SPECIFICATION forming part of Letters Patent No. 688,910, dated December 17, 1901.

Application filed November 20, 1900. Serial No. 37,171. (No specimens.)

*To all whom it may concern:*

Be it known that I, GEORGE WARREN, a subject of the Queen of Great Britain, residing at 16 York road, Ilford, Essex, England, have invented new and useful Improvements in the Manufacture of Cement or Similar Materials, of which the following is a specification.

This invention relates to improvements in the manufacture of cement and similar materials—such, for example, as plaster-of-paris.

Heretofore it has been usual to manufacture cement and the like by running the slurry sludge or other liquid material from which the cement or the like is to be made onto the floors of drying-chambers, where it remains until it hardens. The solidified mass is then broken up into lumps of suitable size, which are charged into a kiln with fuel, the raw material and the fuel being arranged in alternate layers. The kiln is then fired.

Now my invention has for its object to simplify, and thereby cheapen, the manufacture of cement and similar materials; and to this end I proceed as follows—that is to say, the materials from which the cement is to be formed are prepared in the form of a liquid sludge, after which I convey separated portions of the liquid sludge or the like into molds of any desired shape and size, where it is confined until dried, the said molds being placed upon a suitable drying-floor, so as to dry the liquid and form solid blocks or bricks. In practice I find it advantageous to place the molds in a suitable frame upon the roof of the kiln, which thus acts as the drying-floor. After the liquid sludge is introduced into the molds and before being dried I advantageously add to it small coal or other suitable fuel, thus wholly or partially obviating the necessity of adding fuel in the kiln. The blocks or bricks formed are removed from the molds and set up in the kiln, which is preferably a continuous kiln of any suitable known form. As above mentioned, by incorporating the fuel with the blocks no fuel is required to be mixed with the blocks when introduced into the kiln, except that necessary for starting the firing.

It will be clear that by proceeding as above described I effect considerable economy in labor and fuel as compared with the methods of manufacturing cement and the like heretofore in vogue.

Having now particularly described and ascertained the nature of my said invention and in what manner the same is to be performed, I declare that what I claim is—

1. The process of manufacturing cement and the like, which consists in forming the materials into a liquid sludge separating and confining portions of the sludge while in liquid condition, drying said separated portions of the sludge to form blocks, and burning said blocks, substantially as described.

2. The process of manufacturing cement and the like which consists in forming the materials into a liquid sludge, separating and confining portions of said sludge while in liquid condition, incorporating a granular fuel with said sludge while in liquid condition, drying said separated and confined portions of sludge to form blocks and burning said blocks, substantially as described.

GEORGE WARREN.

Witnesses:
C. G. REDFERN,
A. ALBUTT.